United States Patent [19]
Bowes et al.

[11] Patent Number: 5,546,547
[45] Date of Patent: Aug. 13, 1996

[54] MEMORY BUS ARBITER FOR A COMPUTER SYSTEM HAVING A DSP CO-PROCESSOR

[75] Inventors: Michael J. Bowes, Cupertino; Farid A. Yazdy, Belmont, both of Calif.

[73] Assignee: Apple Computer, Inc., Cupertino, Calif.

[21] Appl. No.: 189,138

[22] Filed: Jan. 28, 1994

[51] Int. Cl.⁶ .................................................... G06F 13/00
[52] U.S. Cl. ............................................. 395/294; 395/293
[58] Field of Search .................................... 395/325, 425

[56] References Cited

U.S. PATENT DOCUMENTS

| | | | |
|---|---|---|---|
| 4,641,238 | 2/1987 | Kneib | 395/325 |
| 4,928,234 | 5/1990 | Kitamura et al. | 395/425 |
| 4,987,529 | 1/1991 | Craft et al. | 395/325 |
| 5,263,163 | 11/1993 | Holt et al. | 395/325 |
| 5,301,282 | 4/1994 | Amini et al. | 395/325 |
| 5,313,591 | 5/1994 | Averill | 395/325 |
| 5,353,417 | 10/1994 | Fuoco et al. | 395/325 |

*Primary Examiner*—Jack B. Harvey
*Assistant Examiner*—David A. Wiley
*Attorney, Agent, or Firm*—Blakely, Sokoloff, Taylor & Zafman

[57] ABSTRACT

An arbitration scheme for a computer system in which a digital signal processor resides on the computer system's memory bus without requiring a block of dedicated static random access memory. An arbitration cycle is divided into 10 slices of which 5 slices are provided in each arbitration loop to the digital signal processor. Two slices are provided each to the system's I/O interface and to the peripheral bus controller. A final slice is provided to the system's CPU. A default state when no memory bus resource is requesting the system memory bus parks the memory bus on the CPU. The arbitration scheme provides sufficient bandwidth for real-time signal processing by the digital signal processor operating from the system's dynamic random access memory while also providing sufficient bandwidth for a local area network interface through the system's I/O interface.

8 Claims, 5 Drawing Sheets

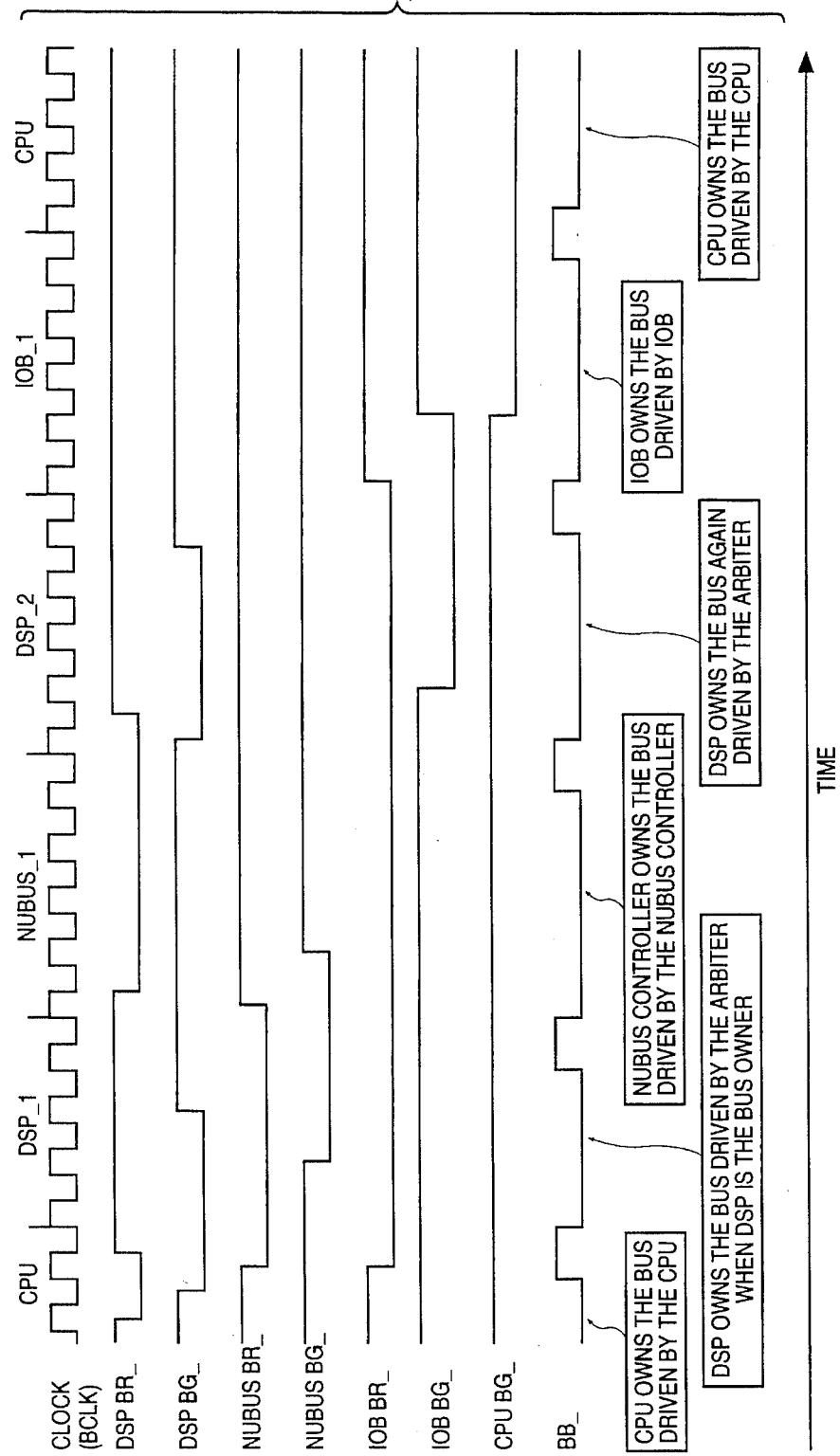

MEMORY BUS ARBITER FOR A COMPUTER SYSTEM HAVING A DSP CO-PROCESSOR

BACKGROUND OF THE INVENTION

1. Related Applications

This application is related to U.S. patent application Ser. No. 08/189,139, entitled *"Dual Bus Concurrent Multi-Channel Direct Memory Access Controller and Method"*, Ser. No. 08/189,132, entitled *"Multiple Register Set Direct Memory Access Channel Architecture"*, and Ser. No. 08/189,131, entitled *"Direct Memory Access Channel Architecture and Method for Reception of Network Information"*, each of which is assigned to the assignee of the present invention and filed concurrently herewith.

2. Field of the Invention

The present invention relates to digital computer system architecture. More particularly, the present invention relates to a computer architecture in which multiple processing units share a common memory bus and support real-time applications.

3. Description of Related Art

Until recently, telecommunications and computing were considered to be entirely separate disciplines. Telecommunications was analog and done in real-time whereas computing was digital and performed at a rate determined by the processing speed of a computer. Today, such technologies as speech processing, sound processing, electronic facsimile and image processing have blurred these lines. In the coming years, computing and telecommunications will become almost indistinguishable in a race to support a broad range of new multimedia (i.e., voice, video and traditional data) applications. These applications are made possible by emerging digital-processing technologies, which include: compressed audio (both high fidelity audio and speed), high resolution still images, video, and high speed signal transmission such as by means of modem or facsimile exchange. The emerging technologies will allow for collaboration at a distance such as by video conferencing.

Each of these aspects of real-time information processing may require dedicated processors designed for their implementation. However, it is becoming more and more common to use programmable digital signal processors (DSP) available on the market today, such as the AT&T® DSP3210. DSPs are autonomous processors having their own real-time operating systems. As such, they are ideally suited to real-time audio and image signal processing.

In handling real-time information such as speech recognition and modem functionality, a DSP requires a large amount of bandwidth to memory for processing the sheer volume of data required to effectuate real-time computing. FIG. 1 illustrates a typical computer architecture in which a CPU 10 is coupled to a memory bus 100. The memory bus 100 may also be referred to as the system bus or CPU bus. In any event, it is this bus which couples the system's CPU 10 to the I/O interface 15 and the various components of the memory subsystem. In FIG. 1, the CPU is in communication with a ROM 12 and the main memory subsystem 14 through the memory bus 100. The main memory subsystem 14 usually comprises a memory controller and a large array of dynamic random access memory (DRAM) for supporting operating applications and data for access by the CPU over the memory bus 100. The main memory subsystem is distinguished from mass storage 16 which may comprise hard magnetic disk drives or a CD-ROM which provide for relatively slow access, high volume storage of information. Access times to mass storage are slower in part because of the need to process requests through the I/O interface and the inherently slower nature of mass storage devices. The memory subsystem's DRAM, on the other hand, is semiconductor memory which provides for fairly quick storage and retrieval for operating applications and which may be fed from the slower mass storage 16 through the I/O interface 15 over the memory bus 100 to meet the requirements of the CPU 10.

In many computer systems, the I/O interface 15 is also a direct memory access (DMA) controller which manages the transfer of data between I/O devices and the main memory subsystem without requiring the CPU to perform that task. The I/O interface 15 may also be used for coupling the computer system to other computer systems over a network such as an Ethernet local area network.

Also shown coupled to the memory bus 100 in FIG. 1 is a digital signal processor (DSP) 20. The logic or controller needed to couple the DSP to the memory bus is not shown. The DSP 20 may be an off-the-shelf DSP such as the AT&T® DSP3210. Most DSPs include an on-board cache of static random access memory (SRAM) which in the case of the AT&T DSP3210 is an 8-Kbyte SRAM cache. In prior art computer systems, because of the high bandwidth required for real-time processing by a DSP, it has not been possible for the DSP to run off of the computer system's DRAM in the way the CPU 10 utilizes it without adversely affecting the rest of the computer system. Thus, there has been provided a large block of SRAM 24 for use by the DSP 20. This has allowed the memory bus to be relatively free of DSP requests yielding the freedom to process CPU requests and requests from I/O devices or networks through the I/O interface without having to contend for the bandwidth required by the DSP 20.

A significant disadvantage to the prior art computer architecture of FIG. 1 is the requirement of a substantial block of static random access memory 24. SRAMs are significantly more expensive than DRAM which greatly increases the cost of computer systems which incorporate SRAM. One object of the emerging multimedia technologies is to bring these technologies to the mass market in configurations as inexpensive as possible. It is therefore one object of the present invention to provide a computer architecture which incorporates DSP technology for real-time data processing without requiring the inclusion of expensive SRAM to support the DSP.

SUMMARY OF THE INVENTION

From the foregoing, it can be appreciated that a computer architecture which provides for a digital signal processor to operate as a co-processor with a CPU over a common memory bus without requiring expensive static random access memory would be greatly advantageous. Accordingly, it is an object of the present invention to provide a mechanism and method for arbitrating the memory bus bandwidth to efficiently allow the use of a digital signal processor and a CPU over a common memory bus sharing the system's dynamic random access memory subsystem without requiring an expensive block static random access memory. It is further an object of the present invention to provide an arbitration scheme in which, in addition to the CPU and digital signal processor, a DMA controller and a peripheral card expansion bus controller might also access the memory bus with all bus masters receiving sufficient bandwidth over the memory bus to provide for real-time isochronous data processing.

These and other objects of the present invention are provided by a computer architecture in which a CPU and digital signal processor (DSP) as well as other memory bus masters are provided on a common memory bus with the system's dynamic random access memory subsystem. An application specific integrated circuit (ASIC) for arbitrating between bus masters is provided which implements an arbitration scheme for sharing the bandwidth of the system's memory bus to provide the DSP with sufficient access to the DRAM to carry out real-time, isochronous data processing while still allowing the system's I/O controller to satisfy Ethernet communication requirements over the memory bus. The arbitration scheme of the present invention is an adaptive arbitration scheme that varies access to the memory bus as a function of time and depends upon what operations the various bus masters are requesting. The next state of the bus arbiter depends on the present state, in addition to the amount of bus traffic and history of prior requests.

The arbitration scheme is tuned to maximize accessibility of the memory bus to the DSP which has by far the greatest bandwidth requirements. A cycle in the arbitration scheme is divided into 10 time slices of which 5 slices are available for the DSP to assert the memory bus. However, the total amount of time in a given cycle that the DSP is allotted the memory bus is limited by a watchdog timer in the arbitration module so as not to choke off the other potential bus masters.

During the arbitration cycle, each of the potential bus masters may signal a bus request over the memory bus and a priority scheme defined by a state diagram determines which bus master will next have access to the memory bus. In the preferred embodiment of the present invention, to save a pin on the CPU, the CPU does not utilize the means for requesting the memory bus. Instead, the default state for the arbiter is to assign the memory bus to the CPU when no other bus master is requesting it. Further, at the end of each arbitration cycle, the last frame is reserved for the CPU which may then carry out any desired operation.

Finally, the present invention is implemented in such a way that the clock rate of the DSP need not be synchronized with the rest of the modules in the computer system. In this way, enhancements in DSP technology will allow faster digital signal processors to be incorporated in computer systems without requiring total redesign of the architecture. The arbiter ASIC effectively has a separate set of state machines devoted to the time domain of the digital signal processor which operate in conjunction with the state machines of the modules operating in the time domain of the rest of the computer system. A brief amount of time is required for resynchronizing to the different time domains on the memory bus which is justified by the increased flexibility in the design of the computer architecture.

BRIEF DESCRIPTION OF THE DRAWINGS

The objects, features and advantages of the present invention will be apparent from the following detailed description in which:

FIG. 5 illustrates a timing diagram showing a simple state transition sequence in accordance with a preferred embodiment implementation of the present invention.

DETAILED DESCRIPTION OF THE INVENTION

Figure 1:
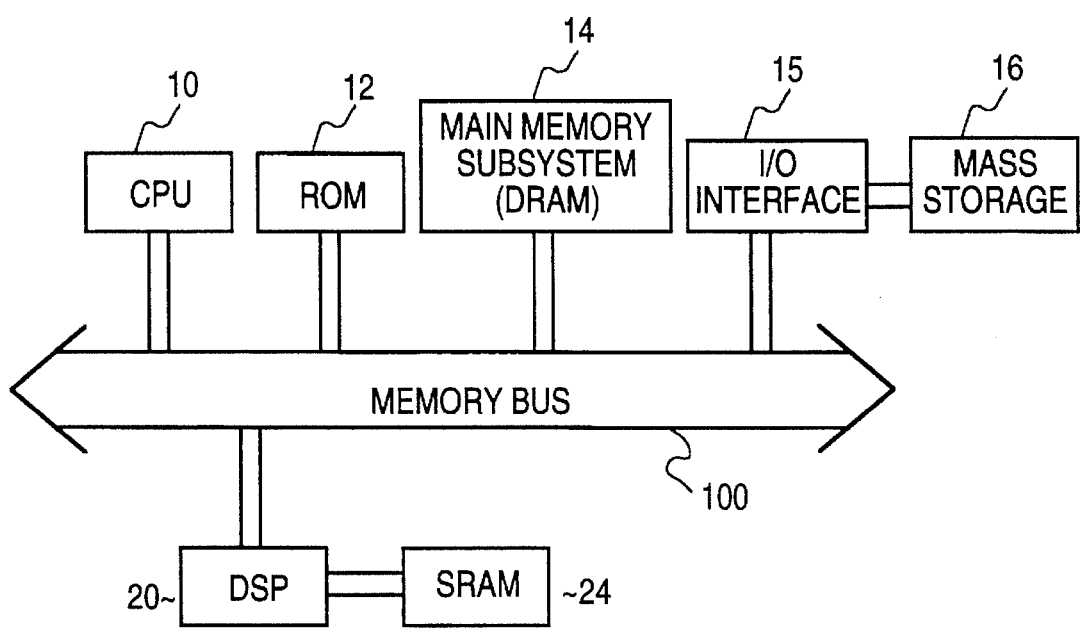
FIG. 1 illustrates a prior art computer architecture in which a digital signal processor requires an expensive static random access memory block.

A method and apparatus are described for the arbitration of a number of bus masters over a memory bus in a computer system architecture supporting a digital signal processor. Throughout this detailed description numerous details are specified such as I/O devices and network standards, in order to provide a thorough understanding of the present invention. To one skilled in the art, however, it will be understood that the present invention may be practiced without such specific details. In other instances well-known control structures and gate level circuits have not been shown in detail in order not to obscure unnecessarily the present invention. Particularly, the arbitration module for implementing the arbitration scheme of the present invention, in the preferred embodiment, is implemented in an application specific integrated circuit (ASIC). With today's manufacturing technology, the development of ASICs generally does not require the rendering of fully detailed circuit diagrams. The definition of logic functionality and state diagrams allow computer aided design techniques to design the desired integrated circuit. Accordingly, the present invention will be described primarily in terms of functionality to be implemented by an ASIC. The software used for developing the ASIC chip from the logic defined for the preferred embodiment will be attached as an appendix. Those of ordinary skill in the art, once given the following descriptions of the various functions to be carried out by the present invention will be able to implement the necessary logic in an ASIC or other technology without undue experimentation.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyrights whatsoever.

The present invention concerns a computer architecture in which a digital signal processor (DSP) operates as a true co-processor in the computer system. That is, an arbitration technique and mechanism are implemented which allows a DSP to reside on the system's CPU or memory bus and share the memory bus resources with the other potential bus masters on the memory bus. The scheme is implemented such that the DSP is provided with sufficient bandwidth to perform real-time digital signal processing using the system's dynamic random access memory (DRAM) and not requiring the incorporation of an expensive block of static random access memory (SRAM). DRAM is far less expensive than SRAM and the elimination of a block of SRAM greatly reduces the cost of computer systems. The DSP is provided with sufficient bandwidth on the memory bus to perform real-time isochronous signal processing, yet at the same time the arbitration scheme of the present invention prevents the other bus masters from being starved from the bandwidth they require in carrying out their operations.

While the present invention arbitration scheme will be described in term of a particular implementation of a computer system, it should be understood that the broad concept of providing for a DSP on a memory bus and sharing the system's DRAM may be extended to other more complicated systems, or generalized to simpler systems.

Overview of the Present Invention Computer System

Figure 2:
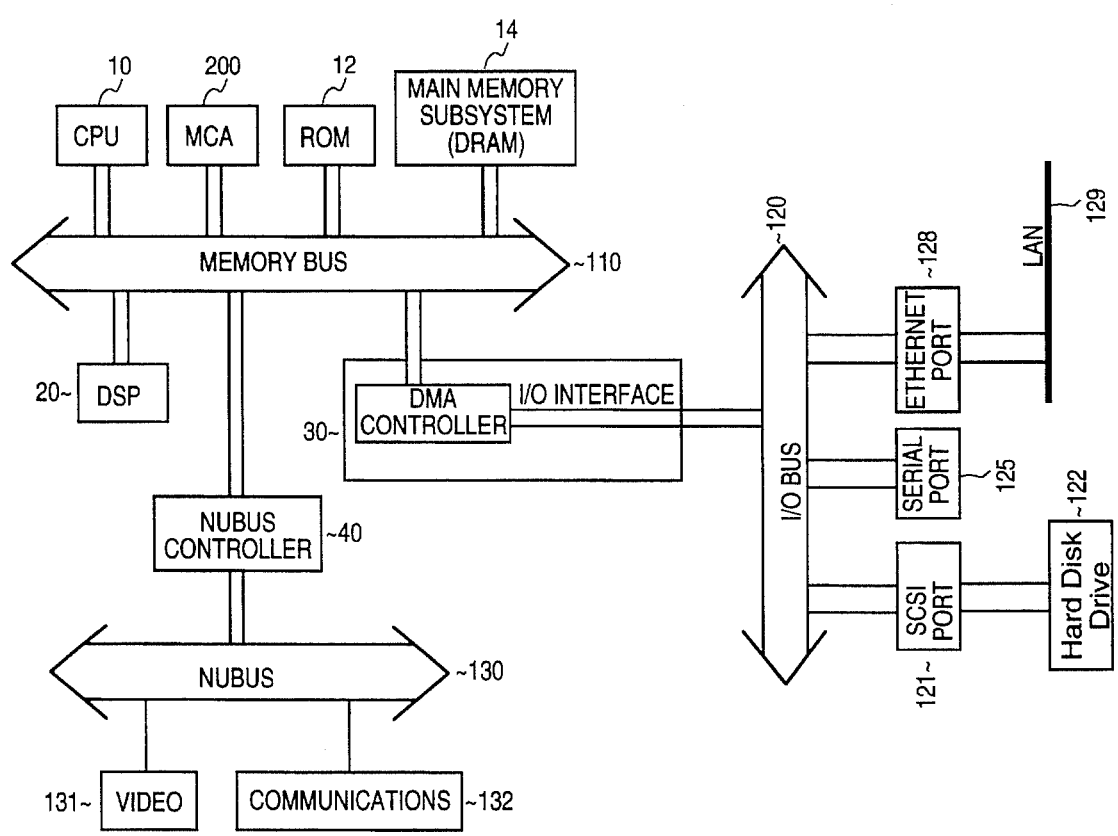
FIG. 2 illustrates a block diagram of a computer architecture incorporating the present invention arbitration scheme.

Referring now to FIG. 2, a preferred embodiment computer architecture implementing the present invention is shown. The constituents of the computer architecture are shown coupled to a CPU or memory bus 110. The memory bus 110 provides the signal paths for the exchanging of data between the various elements on the memory bus. Further provided by the memory bus are control lines for such things as bus requests and bus granting signals and other system level control signals. The signals required for implementing the present invention will be described further herein. As with the prior art computer systems, the architecture illustrated in FIG. 2 has the CPU 10, the ROM 12 and the system's main memory subsystem 14 coupled to the memory bus 110. It should be understood that in the illustration the main memory subsystem 14 coupled to the memory bus refers to the system's DRAM and the controller required for writing to and reading from the DRAM based on a requested transaction. The CPU 10 may be considered a potential bus master as contrasted with the memory components 12 and 14 which are considered bus slaves. The ROM 12 and main memory subsystem 14 will not drive the memory bus for transactions on their own behalf.

The preferred embodiment computer architecture of FIG. 2 has a number of other potential bus masters coupled to it. The I/O interface 30 is used for coupling the memory bus to the I/O bus 120 for providing the computer system with a number of I/O capabilities. The I/O interface 30 of the present invention is also a DMA controller which controls the transactions between the main memory system 14 and I/O devices without requiring the resources of the CPU 10 for these transactions. The DMA controller of the preferred embodiment implementation is described in co-pending U.S. patent applications: Ser. No. 08/189,139, entitled *"Dual Bus Concurrent Multi-Channel Direct Memory Access Controller and Method"*, Ser. No. 08/189,132, entitled *"Multiple Register Set Direct Memory Access Channel Architecture"*, and Ser. No. 08/189,131, entitled *"Direct Memory Access Channel Architecture and Method for Reception of Ethernet Packets"*, assigned to the assignee of the present invention and filed concurrently herewith.

The I/O bus 120 of the preferred embodiment implementation as illustrated in FIG. 2 provides the avenue for a number of different I/O devices to be incorporated in the computer system. For example, the SCSI port 121 is coupled through the I/O bus 120. SCSI stands for small computer system interface which is one of the computer industry's standards for coupling I/O devices such as the hard disk drive 122 or floppy drives or other storage media and other I/O devices to today's microcomputer systems. The computer system's serial port 125 is also coupled to the I/O bus 120. The serial port can be used for attaching a modem or printer or other serial devices. Finally, the I/O bus 120 is used to couple the computer system to a local area network through the Ethernet port 128. The Ethernet port 128 is used for attaching the computer system of the present invention to a local area network such as Ethernet or other LAN 129. This allows the computer system to communicate with other computer systems and share common resources such as community printers, etc. As will be described further herein, the provision of an Ethernet connection to the present invention computer system introduces constraints for the bandwidth sharing of the memory bus.

Another potential bus master coupled to the system bus 110 of the preferred embodiment computer system is a peripheral card expansion bus controller. The peripheral card expansion bus controller illustrated in the figure is the NuBus controller 40. While the present illustration uses a NuBus controller, other peripheral card expansion bus protocols are generally known. The NuBus controller 40 is used to provide communication between the various memory bus masters and the system's expansion bus 130, called NuBus. The NuBus provides a fast backplane for coupling such things as video controllers 131, RAM expansion cards, mass storage device controller cards, or other communications devices 132. Again, the preferred embodiment computer system is constrained by some of the NuBus requirements in the bandwidth sharing of the memory bus 110.

Also, in FIG. 2 there is illustrated another potential bus master, the digital signal processor (DSP) 20. Unlike prior art computer systems, the present invention provides for the DSP 20 to reside on the system's memory bus and operate from the computer system's main memory subsystem 14. In implementing the present invention this greatly reduces system cost by eliminating the need for an expensive block of SRAM. In the preferred embodiment implementation, the DSP 20 is an AT&T DSP3210 which provides an internal 8K SRAM cache. This is an off-the-shelf DSP which is highly programmable and has a fairly well defined operating system. The DSP can be programmed to carry out such functions as speech processing, audio channel control, modem emulation, image processing and the like. Many of these functions are real-time operations and require a tremendous amount of the memory bus bandwidth between the DSP and the DRAM of the main memory subsystem 14. For reasons that will be described further herein, the DSP 20 is not constrained to operating at the same clock speed as the rest of the components of the computer system. This will require some resynchronizing for various operations to be described, but provides for flexibility as newer technology and faster DSPs are developed.

Finally, in FIG. 2 there is coupled to the memory bus 110 the memory controller and arbiter (MCA) 200. In the preferred embodiment implementation, the arbiter 200 is an applications specific integrated circuit (ASIC) for arbitrating the memory bus 110 between the various bus masters subject to the constraints each imposes to provide optimal bandwidth for each, particularly the DSP which is responsible for a significant amount of real-time signal processing. In an alternative embodiment, the arbiter logic could be designed in some other form of logic.

Arbitration Constraints

Because the primary motivation of the present invention is to incorporate a digital signal processor as a co-processor on a computer system's memory bus while providing it sufficient bandwidth to utilize the system's DRAM rather than an expensive block of SRAM, it is necessary to talk about the various modes of operation of the DSP, particularly for carrying out real-time processing. As was indicated, the DSP 20 is programmable and has an 8-Kbyte internal SRAM cache. Ideally, software written for the DSP should be segmented in such a way that blocks may be loaded into the cache of the DSP allowing the DSP to run as much of the time as possible from its internal cache. Thus, one mode in which the DSP will utilize the memory bus 110 is to read a large block memory from the DRAM 14 into its internal SRAM. This first mode of operation on the memory bus can be referred to as a "block read". Another mode of operation concerns the handling of data that has already been processed by the DSP. In many cases it will be necessary to push that data back out to the DRAM so that some other parts of the computer system can utilize it. Thus, the capability of bursting data out is a second mode of operation which may be referred to further herein as a "block write".

Because of the nature of some software, it is not always guaranteed that the code is going to be divisible into discrete blocks for block read operations. There may be times when it is necessary to repeatedly access the DRAM, effectively supporting a scheme where the DSP executes code directly from the DRAM. As contrasted with a block read, this might be considered a situation of "back-to-back single reads" from the DRAM. The occurrence of these back-to-back operations is recognizable and will be considered by the arbiter scheduling algorithm to be described further herein. Finally, during the course of normal operation there may be situations in which the DSP requires only a single piece of data from the DRAM. These types of read operation are referred to as "scattered-single reads". Because the DSP will be processing many real-time operations as well as others, each of these modes of operation where the DSP must have access to the memory bus must be taken into consideration by the arbitration scheme of the present invention.

In addition to the DSP's huge requirement for bandwidth on the memory bus, the arbiter 200 must also contend with constraints imposed by other resources on the memory bus. Particularly, the I/O interface 30 provides the interconnection of the computer system to an Ethernet local area network. This Ethernet connection should never be choked off because losing an Ethernet packet results in a tremendous penalty in time for recovery. Thus, the I/O interface 30 must be guaranteed at least a predetermined amount of time for every arbitration cycle to support the system's Ethernet connection. The floppy disk drive, serial ports and audio input/output DMA, in a similar fashion, also require some guaranteed memory bus bandwidth. Likewise, with all other constraints taken into account, the system's SCSI performance should not be allowed to degrade below an acceptable level.

Similar to the I/O interface constraints, there are constraints imposed by the computer system being coupled to an expansion bus through the NuBus controller 40. Like the I/O interface, there are certain latencies that NuBus introduces which must be provided for thus requiring a guaranteed amount of memory bus availability each arbitration cycle for the NuBus controller. Finally, though the CPU does very little in the way of real-time operation in a system having a DSP, it still must have some access every arbitration cycle to the main memory subsystem 14.

Arbitration Algorithm

From the foregoing, it can be appreciated that in a computer system in which a DSP resides on the memory bus and satisfying all the potential memory bus master's bandwidth requirements will have to be finely tuned. During the operation of the computer system of the present invention, the four potential bus masters, the CPU, the DSP, the I/O interface and the NuBus controller may each at various times require the memory bus. When this occurs, the resource propagates a bus request signal over the memory bus 110 to the arbiter 200. A figure referred to further herein will indicate more clearly what signals are required for the various bus requests. When the memory bus is available for assignment, the arbiter 200 will issue a bus grant signal to one of the resources according to a priority scheme which takes into consideration all of the constraints described above as well as various previous states of the system and the present state of the system.

Figure 3:
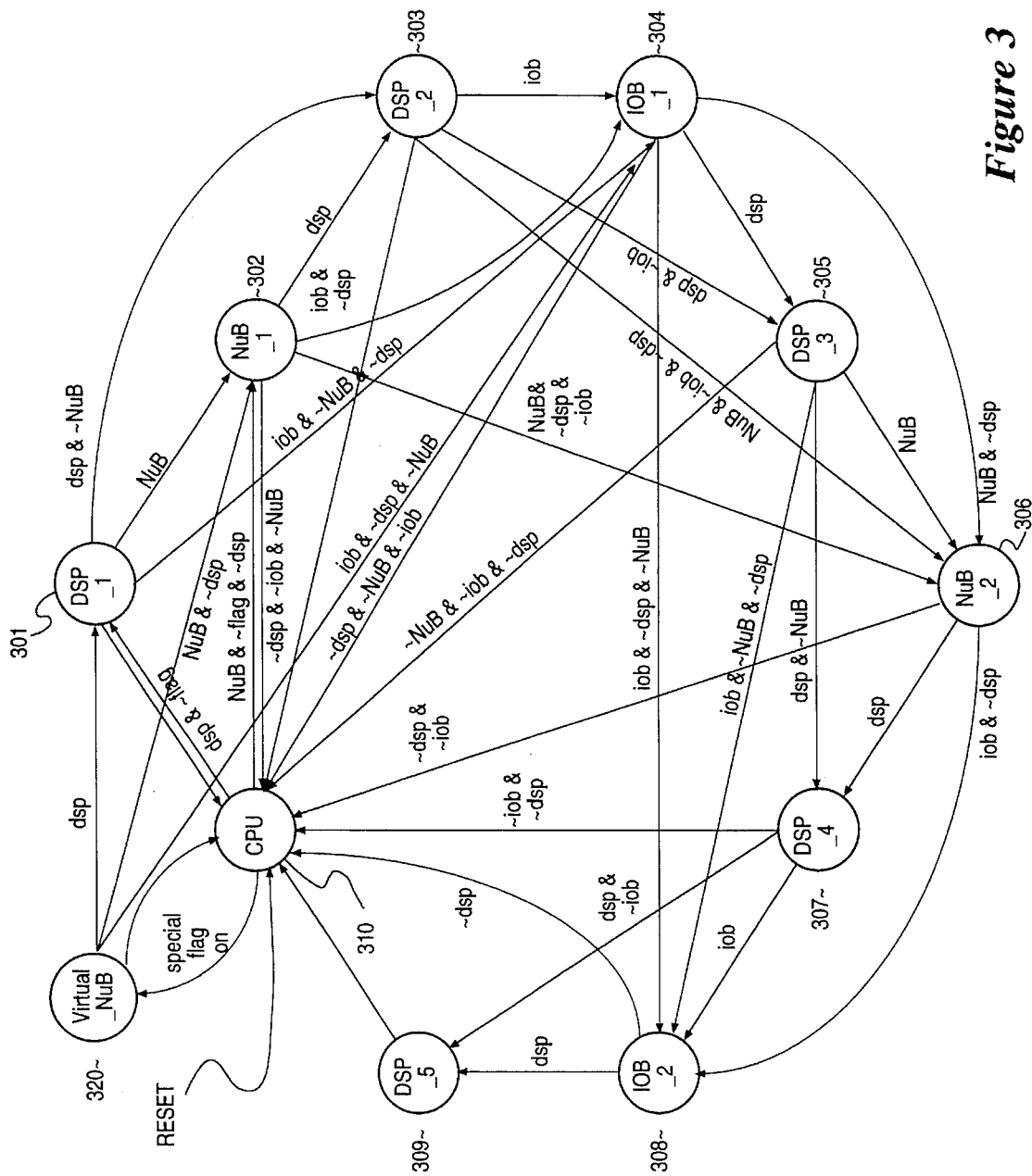
FIG. 3 illustrates a state diagram of the arbitration scheme for assigning bandwidth slots to the various components of the preferred embodiment computer architecture.

Referring now to FIG. 3, a state diagram is illustrated which is used to derive the logic of the arbiter ASIC 200. This state diagram is the preferred embodiment arbitration scheme for the implemented computer system described with respect to FIG. 2 which has, in addition to a CPU and a DSP on the memory bus, an I/O interface for coupling the system to a local area network and other I/O devices as well as a NuBus interface with each imposing considerable constraints. The state diagram illustrated in FIG. 3 is instrumental in developing the VERILOG code or equivalent in the production of the arbiter ASIC 200. The code for the preferred embodiment arbitration scheme is set forth in Appendix A.

The bus arbiter 200 follows the priority scheme illustrated by the state diagram of FIG. 3. The arbiter receives the bus request signals from the potential bus masters, and based on the present state and a specified priority order asserts an appropriate bus grant signal. In the preferred embodiment implementation, to save a pin on the CPU, the CPU 10 does not issue bus request signals. Instead, the state of the memory bus assignment defaults to the CPU and remains parked on the CPU until other resources request the memory bus. The CPU is also provided with one time slot in the priority scheme to be described in which it is granted the memory bus.

Each circle in the arbiter state diagram of FIG. 3 represents a present state memory bus assignment and the arrows represent the state transition from a current bus master to the next bus master when the specified conditions are met. Because the DSP has the largest bus bandwidth requirement, the system is optimized to meet its need and support its real-time operations. In order to optimize this requirement and still give a reasonable bandwidth to the other bus masters, the DSP is assigned 5 time slots among a total of 10 in the arbitration loop. The arbitration loop starts at DSP__1 state 301 and ends at the CPU state 310. The CPU state 310 is the point of reference which also designates the completion of the entire arbitration loop. The NuBus controller 40 and the I/O interface 30 each own 2 time slots in the arbitration loop while the CPU 10 owns only 1 slot. The sequence through the arbitration loop is the following: DSP__1→NuB__1→DSP__2→IOB__1→DSP__3→ NuB__2→DSP__4→IOB__2→DSP__5→CPU. This will be the order of memory bus ownership if all bus masters are requesting the bus in every state, though with some restrictions to be described further herein.

The state diagram of FIG. 3 illustrates that from a state after reset at the CPU memory bus state a transition to the DSP__1 state 301 is made if the DSP is requesting the memory bus and a special flag has not been asserted. The special flag concerns a degenerate state with respect to the NuBus controller which will be described further herein. From the DSP__1 state 301 the arbiter will next assign the state of the memory bus to the NuBus controller state 302 if the NuBus controller is requesting the memory bus. If the NuBus controller is not requesting the memory bus when the system is in DSP__1 state, but the DSP continues to request it, the memory bus will remain assigned to the DSP and transfer to the DSP_2 state 303. Similarly, if neither the NuBus controller nor the DSP is requesting the memory bus while the system is in DSP state 301, and the I/O interface does request the bus, the arbiter will assign the memory bus to the IOB_1 state 304. From the DSP_1 state 301, if no other resource is requesting the memory bus when the slot is completed, the state of the system bus reverts to the CPU state 310 with the memory bus being parked there until one of the resources requests it.

The memory bus assignment follows the state diagram through the remaining states 305, 306, 307, 308 and 309 according to the conditions of bus requests and the previous state of the system at each state. In this way, it can be seen that the arbitration loop is divided into 10 frames with an appropriate allotment to each resource to support the bandwidth requirement of each resource being provided.

Alternative DSP Operation Modes

To increase the DSP memory bus bandwidth efficiency, the DSP is allowed to perform finite numbers of back-to-back cycles in each DSP arbitration slot. However, it is necessary to limit the overall total DSP bus ownership period in a given arbitration loop so as not to starve the other bus masters who need to own the memory bus. Therefore, the arbiter 200 incorporates a watchdog timer 241 (FIG. 4) that counts the number of system clocks that the DSP has owned the memory bus in a given arbitration loop. When a predetermined limit is reached (2.4 microseconds in the preferred embodiment) the arbiter then allows the last DSP cycle to complete (that includes both single and burst memory cycles) before blocking off the DSP to arbitrate for the bus during the remainder of the present arbitration loop. The memory bus will not be assigned to the DSP for the remaining DSP slots in that arbitration loop until the CPU state 310 has been reached which also represents the end of the loop. The predetermined limit of 2.4 microseconds was selected for the preferred embodiment implementation to optimize the required bus latency and bandwidth of the DSP, I/O and NuBus controller by the particular computer arrangement described. In a more general case, this predetermined limit could be different due to the characteristics of the various bus masters in the assembled computer system.

Thus, it is possible that in DSP_1 state 301 the DSP will use up all its allotted time for a given arbitration loop and the DSP states 303, 305, 307 and 309 will not be allowed to occur. The system facilitates this by asserting a signal DSPLOCK to the arbiter logic which prevents the assignment of any additional DSP slots in the given arbitration loop. Once the CPU state 310 is reached, the DSP block signal is reset and the watchdog timer starts over in the next loop.

The Arbiter of the Present Invention

Figure 4:
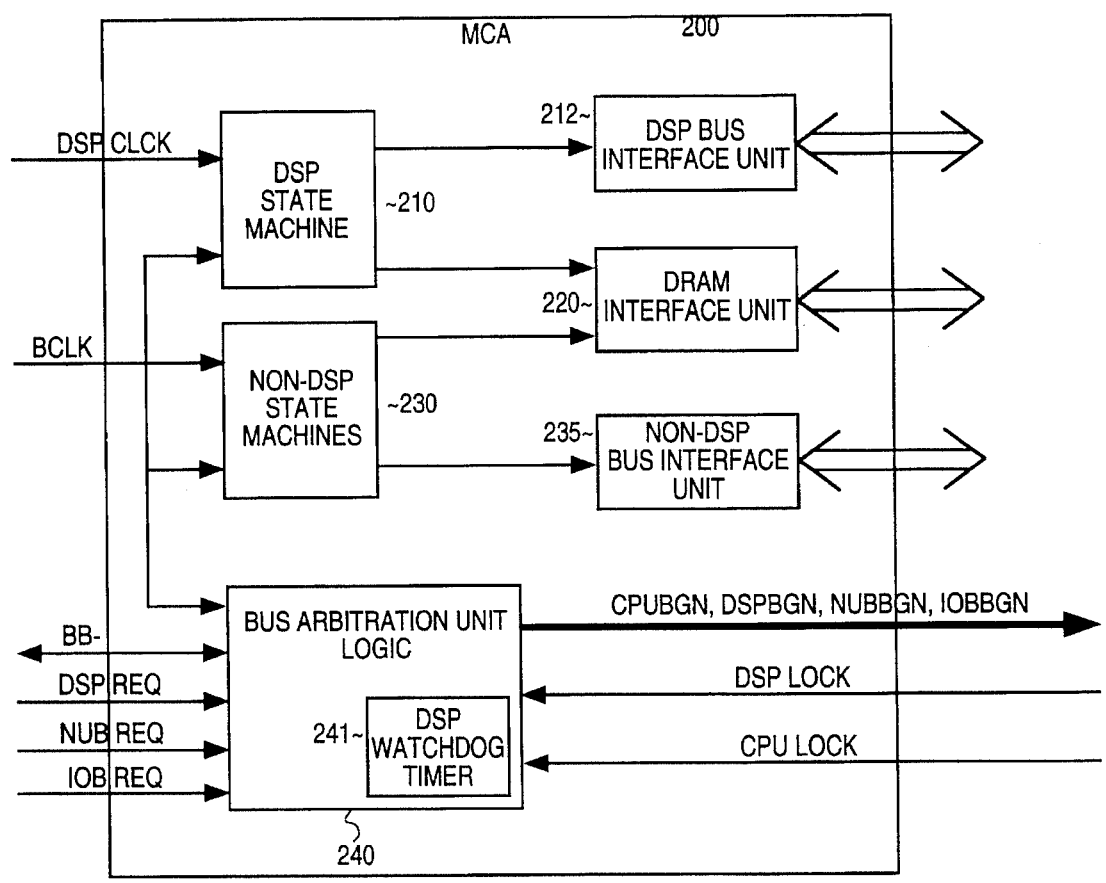
FIG. 4 illustrates a more detailed logical representation of the arbiter for implementing the arbitration scheme of the present invention.

Before addressing additional implementation detail of the various units implemented in the preferred embodiment computer system, it is useful to refer now to FIG. 4 in which the logical blocks of the arbiter 200 are illustrated. Because the digital signal processor is allowed to run off a separate clock from the system clock, a dedicated DSP state machine 210 is implemented which is responsive to the DSPCLK clock signal. The DSP state machine 210 is in communication with the DSP bus interface 212 and the DRAM interface unit 220. Because the DSP may run at a different clock speed, these units are used to synchronize the operation of the DSP bus arbitration interface to the clock speed of the system clock (BCLK) when the DSP is the bus master. The non-DSP memory bus resources are clocked to the system clock and thus there is illustrated the non-DSP state machines logical block 230 which is clocked to the BCLK system clock signal. This state machine is also coupled through the DRAM interface unit 220 as well as the non-DSP bus interface unit 235.

The arbitration logic of the ASIC which implements the state diagram priority scheme of FIG. 3 is illustrated as bus arbitration logic 240 which incorporates the DSP watchdog timer 241. The bus arbitration logic 240 is responsive to requests for the memory bus for the DSP, the NuBus controller and the I/O bus interface. As was indicated, to save a pin on the arbiter ASIC, the CPU receives the memory bus in various default states. The arbitration logic 240, according to the priority scheme, controls the signaling of the bus grant signal lines for signaling whether the bus is granted to the CPU, the DSP, the NuBus controller or the I/O interface. The logic is also responsive to the DSPLOCK blocking signal which occurs when the watchdog timer 241 times out, and also responds to a CPULOCK blocking signal which is activated when the CPU is executing lock cycles.

The bus arbitration logic 240 is also responsive to the bus busy, BB-, signal which is signaled when a memory bus resource is active on the memory bus in response to a bus grant. It is important to note that the DSP itself does not signal the bus busy when it occupies the bus. Instead, the arbiter itself signals the bus busy when the DSP is assigned the memory bus. Because the DSP operates at a different clock rate, there is some overhead in resynchronizing the system from the DSP to the non-DSP clock rates. Accordingly, when the DSP is active on the bus in such a mode that it might be requiring the memory bus soon after it has just used it, the arbitration logic waits several clock cycles (2 system clock cycles in the preferred embodiment) to see if another DSP request is propagated. In this way, if the DSP is going to soon again require the memory bus, time is not lost in the resynchronization of the system to the system clock and then back to the DSP clock in successive cycles.

Once the DSP has ignored the memory bus for several clock cycles, the bus arbitration logic deasserts the bus busy signal. Since the arbiter had already granted the memory bus to the next requester in the priority scheme, that master grabs the bus and asserts a bus busy signal. During the time that the DSP is granted the memory bus and the bus arbitration logic 240 holds the bus busy signal active even though the DSP may not be utilizing the memory bus, the watchdog timer 241 continues to run to ensure that not too much time on the memory bus in a given arbitration loop is dedicated to the DSP for the reasons described above.

Unlike the DSP, the other memory bus masters, the CPU, NuBus controller and I/O interface themselves drive the bus busy signal when they are utilizing the memory bus. When they complete their memory bus transactions, they deassert the bus busy indication signal and the bus arbitration logic may then supply a bus grant signal to the next requesting bus master according to the priority scheme. It should be understood that bus granting is a dynamic activity wherein a resource may request the bus while another resource is busy as indicated by the bus busy signal and then determine that it does not need the memory bus. However, a bus grant signal should only be propagated when the bus busy signal indicates that the bus is ready thereby avoiding conflict and collision on the memory bus. The timing diagram shown in FIG. 5 best clarifies this. Each master has its own bus request (to indicate to the arbiter when it needs the bus) and a bus grant (which is asserted by the arbiter in advance and in combination with bus busy (BB_) high (deasserted) indicating to the master to take over the bus). The bus busy signal is shared by the CPU, I/O and NuBus controllers.

The timing diagram of FIG. 5 illustrates a simple state transition sequence and the way it directly depends on the present state of the arbiter and the different bus request arrival times. The active states of the arbiter are shown at the top of the diagram with the function of time. Initially, the bus is parked on CPU. CPU keeps the BB_ signal active as long as its bus grant is active and it needs the bus. The arbiter detects the DSP asserting its bus request signal and deasserts the CPU bus grant which causes the CPU to negate BB_ and get off the system bus upon completing the current bus cycle. When the CPU deasserts BB_, the arbiter grants the bus to the DSP by asserting the DSP bus grant. The arbiter state changes from CPU to DSP_1 when the arbiter detects BB_ high and the DSP's bus grant low (active). Sometime later, NuBus requests the bus while DSP is still the owner of the system bus. The arbiter asserts the NuBus bus grant signal, based on the present state of the arbiter (DSP_1) and the priority of NuBus. DSP owns the bus until the arbiter brings DSP's bus grant high and negates BB_. In the meantime, the NuBus controller is granted the bus ahead of time and is waiting for BB_ to go high. When BB_ is deasserted by the arbiter at the end of the DSP cycle, NuBus controller takes over the bus and asserts BB_. The arbiter changes state from DSP_1 to NuBus_1 when BB_ is high and NuBus's grant is active. While in the NuBus_1 state, the arbiter detects the DSP request and waits until the NuBus controller deasserts BB_ before granting the bus to DSP and asserts BB_.

The CPU, I/O controller, and NuBus controller each assert BB_ when they take over the bus to indicate to the other masters and the arbiter that the system bus is already active. The DSP, however, has a different bus interface and does not use the BB_ signal and, therefore, the arbiter does the job of asserting this signal to keep the other bus masters off the bus. Note in the example of FIG. 5 that the I/O controller requested the bus a while before the DSP requested the bus the second time. The arbiter did not, however, grant the bus to the I/O controller because it has a lower priority than the DSP in the arbitration state sequence. The arbiter changes state from NuBus_1 to DSP_2. While the DSP is active on the bus, the arbiter grants the bus to the I/O controller since its bus request is still pending and has the next priority. When the DSP is finished, the arbiter deasserts BB_. Since the I/O controller is already granted the bus and BB_ is high, it takes over the bus and asserts BB_. The arbiter changes state from DSP_2 to IOB_1 by detecting BB_ high and the IOB bus grant active. While the I/O controller owns the bus, the arbiter checks for all bus requests and since none are active, it grants the bus to CPU. When BB_ is negated by IOB, the CPU takes over the bus and asserts BB_. The arbiter jumps from state IOB_1 to CPU when BB_ is high and CPU bus grant is active. The CPU state marks the end of the arbitration cycle.

Exceptional NuBus State to Contend With

Referring back now to FIG. 3 there is a special state that needs to be described. State 320 is indicated as a Virtual_NuBus state which is inserted at the end of a bus arbitration loop to facilitate the NuBus controller's need for the memory bus under special circumstances. The NuBus controller imposes some interesting arbitration requirements due to NuBus latency requirements and the way the NuBus controller's FIFOs allow the queuing of multiple reads and/or writes. NuBus effectively imposes a restriction that a given operation (read or write) cannot take longer than 25.4 μsec. In a system with a NuBus controller containing a one operation deep buffer, this means that a given read or write must terminate within 25.4 μsec. In the implemented system, the NuBus controller has FIFOs which can queue up several operations. The NuBus controller will not necessarily complete all of these operations during a single bus tenure. The controller determines how many operations will be completed during a given bus tenure based upon the state of the FIFOs. In the worst case, seven operations must be completed within 25.4 μsec., yet only one operation will be completed for each bus tenure. Thus, it may be critical that the NuBus controller receive the bus twice per bus arbitration loop in order to complete all operations in the required 25.4 μsec.

When the arbitration loop is in NuB_1 state 302, it is possible that neither the DSP 303 state can be achieved due to either no request by the DSP or the DSPLOCK signal being asserted and likewise the IOB_1 state 304 is not achieved because the I/O interface is not requesting the bus. In that situation the next highest priority would be to assign the NuBus controller the memory bus again at state 306 if the NuBus controller requires the bus. There are some circumstances, however, where at the end of state 302 the NuBus controller will relinquish the bus busy signal and, because the NuBus controller does not pipeline bus requests, by the time it determines that it again requires the memory bus in this arbitration loop the arbiter logic, clocked to the system BCLK signal will have passed that state and proceeded back to CPU state 310. This would provide the opportunity for the system to then jump again to the DSP_1 state 301 for up to 2.4 microseconds for the reasons described above.

In order to meet the NuBus controller bus latency and bandwidth requirements, NuBus is given two opportunities to take over the system bus in an arbitration cycle of ten slots. There is a specific situation where the NuBus controller can miss the second slot even though it requires it and, therefore, the latency requirement could be violated in the worst case where all masters also need the bus and take over the bus for unusually long periods of time. The Virtual_NuBus state 320 is an exceptional state that allows the NuBus controller to have the second opportunity at the end of the arbitration loop without losing it. The arbiter detects this particular case by setting a flag at the end of NuBus_1 state 302 to keep a reminder that NuBus needed the bus and missed the second slot in the arbitration loop. The flag is sampled at the end of the loop to give NuBus the second opportunity that it missed. This special case can occur when the NuBus controller needs the bus more than once. When it finishes the first bus cycle in the NuBus_1 state, the NuBus controller waits for a system clock (BCLK) before requesting the bus again and when there are no more masters requesting the bus at that time, the arbiter cannot catch the NuBus bus request on time (due to the extra BCLK that it took the NuBus controller to reinstate the second bus request) and transitions from NuBus_1 to the default CPU state 310 and, therefore, skips over NuBus_2 state 306. The arbiter logic, however, catches this event and sets a flag which is sampled at the end of the arbiter loop. This flag causes the arbiter to initiate the Virtual_NuBus cycle 320.

It would appear that the same special case could occur for the I/O interface as for the NuBus controller. However, due to the situation implemented in the preferred embodiment it does not occur because the I/O interface does not allow multiple bus cycles like the NuBus interface does when it owns the bus for certain long word writes. In an alternative embodiment where this situation does present a problem for the I/O interface, it may be contended with an exactly the same way as the solution presented for the NuBus controller in the foregoing.

There has thus been described a preferred embodiment arbitration scheme which provides for a computer system having a DSP co-processor which can operate from system DRAM without requiring an expensive block of SRAM. The preferred embodiment implementation is tuned to a system which further includes an I/O interface coupling the computer system to local area network and having a NuBus expansion capability. Of course, those of ordinary skill in the art will see that the principles of the present invention may be applied to systems of differing configurations but wherein it is still desirable to operate a DSP as a co-processor without the expense of SRAM. Accordingly, the scope of the present invention should, therefore, be measured in terms of the claims which follow.

APPENDIX A

```
'timescale 1ns/100ps
/* This module is the central arbitor which arbitrates among    */
/* DSP, PSC, MUNI and CPU with 5/10, 2/10, 2/10, and 1/10 time slot*/
/* designated to the above masters respectively.                */
/*                                                              */ module arbitor( irstbclk_, ibclk, dspbr_,
                ibb_, pscbr_, munibr_, cpulock_, ebb_,
                itea_, bbip, dspblock, muniblock, obb_, pscbg, munibg, cpubg,
                cpuip, dspmstr, drvbb, itea_1_, muni_ip1, muni_ip2,
                v_muni_ip, cpu_ip, ldspbg
              );

/* inputs to the rom/io are defined here    */ input
        irstbclk_,
        ibclk,
        dspbr_,
        ibb_,
        pscbr_,
        munibr_,
        cpulock_,
        ebb_,
        itea_,
        bbip,
        dspblock,
        muniblock;

output
        obb_,
        pscbg,
        munibg,
        cpubg,
        cpuip,
        dspmstr,
        drvbb, itea_1_,
        muni_ip1, muni_ip2, v_muni_ip, cpu_ip,
        ldspbg;

/************** parameter definition ***************************/ parameter CK_TO_Q = 3;
parameter GATE_DL = 3;
parameter RES_TO_Q = 3;

/* /////////// Registered Parameters are defined here ////// */
reg dspbg, ldspbg, dsp_hold, dsp_hold_1,
    dsp_hold_2, dis_ldsp_, cpubg, cpubg_1, sdspbr_,
    dspbr_1, lock_retry, ibb_1, ibb_2,
    cpuip, dspbg_1, obb_, pscbg, pscbg_1,
    munibg, munibg_1, itea_1_,
    munibr_1, pscbr_1;

reg dsp_ip1_1, dsp_ip2_1, dsp_ip3_1, dsp_ip4_1;
reg cpulock_1;
reg [3:0] arbstate;
// Rev'd on 8-10-92
reg muni_ip1_del, v_munirq;

/* ///////////// Wire definition of the arbitor states ///// */
```

```verilog
     wire dsp_ip1, muni_ip1, dsp_ip2, psc_ip1, dsp_ip3, muni_ip2,
         dsp_ip4, psc_ip2, dsp_ip5, cpu_ip, v_muni_ip;

wire cpulock_ip;

assign #GATE_DL dsp_ip1   = ( arbstate == 4'd0  );
     assign #GATE_DL muni_ip1  = ( arbstate == 4'd1  );
     assign #GATE_DL dsp_ip2   = ( arbstate == 4'd2  );
     assign #GATE_DL psc_ip1   = ( arbstate == 4'd3  );
     assign #GATE_DL dsp_ip3   = ( arbstate == 4'd4  );
     assign #GATE_DL muni_ip2  = ( arbstate == 4'd5  );
     assign #GATE_DL dsp_ip4   = ( arbstate == 4'd6  );
     assign #GATE_DL psc_ip2   = ( arbstate == 4'd7  );
     assign #GATE_DL dsp_ip5   = ( arbstate == 4'd8  );
     assign #GATE_DL cpu_ip    = ( arbstate == 4'd9  );
     assign #GATE_DL v_muni_ip = ( arbstate == 4'd10 );

wire en_dsp_ip;
     assign #GATE_DL en_dsp_ip = ~( ( dsp_ip1 & ~dsp_ip1_1 ) |
                                    ( dsp_ip2 & ~dsp_ip2_1 ) |
                                    ( dsp_ip3 & ~dsp_ip3_1 ) |
                                    ( dsp_ip4 & ~dsp_ip4_1 ) |
                                    ( ibb_1   & ~ibb_2      )
                                  );

assign #GATE_DL cpulock_ip = ~ibb_1 & cpulock_1 & ~lock_retry ;

/******************** combinatorial logic **************************/
     wire
        dspmstr, drvbb;

assign #GATE_DL
              dspmstr = ldspbg | dsp_hold_1 | dsp_hold_2;

assign #GATE_DL drvbb = ~( obb_ & ebb_ ) ;

/* ////////// D S P _ I P 1 _ 1 /////////////// */
 always @( posedge ibclk )
     begin
             dsp_ip1_1 = #CK_TO_Q dsp_ip1;
         end /* ////////// D S P _ I P 2 _ 1 /////////////// */
 always @( posedge ibclk )
     begin
             dsp_ip2_1 = #CK_TO_Q dsp_ip2;
         end /* ////////// D S P _ I P 3 _ 1 /////////////// */
 always @( posedge ibclk )
     begin
             dsp_ip3_1 = #CK_TO_Q dsp_ip3;
         end /* ////////// D S P _ I P 4 _ 1 /////////////// */
 always @( posedge ibclk )
     begin
             dsp_ip4_1 = #CK_TO_Q dsp_ip4;
         end // **********    REV'd on 8-10-92
/* ////////// M U N I _ I P 1 _ D E L /////////////// */
```

```
    always @( posedge ibclk )
        begin
                muni_ip1_del = #CK_TO_Q muni_ip1;
        end // **********   Rev'ed on 8-10-92
 /* //////////// V _ M U N I R Q  //////////// */ always @( posedge ibclk or negedge irstbclk_ )
        begin
          if ( !irstbclk_ )
              v_munirq = #CK_TO_Q 1'b0;
          else
              v_munirq = #CK_TO_Q
                        ( muni_ip1_del & cpu_ip & munibr_1 & ~muniblock ) |
                        ( v_munirq & ~( v_muni_ip) );
        end /* //////////// D S P  arbitration related signals //////////// */

/* I B B _ 1     */ always @( posedge ibclk )
      begin
              ibb_1 = #CK_TO_Q ibb_;
      end

/* I B B _ 2     */ always @( posedge ibclk )
      begin
              ibb_2 = #CK_TO_Q ibb_1 ;
      end /* C P U I P  */
wire wcpuip;
assign
   #GATE_DL wcpuip = ( cpubg_1 & ibb_1 ) |
                    ( cpuip & ~( cpuip & ~cpubg_1 & ibb_1 ) ) ;

always @( posedge ibclk or negedge irstbclk_ )
      begin
          if( !irstbclk_ )
              cpuip = #CK_TO_Q 1'b0;
          else
              cpuip = #CK_TO_Q wcpuip;
      end /* This is the early DSP BUS GRANT that behaves like other master */
    /* grants.                                                        */

/* D S P B G */
wire wdspbg;
assign
    #GATE_DL wdspbg = ( cpu_ip & dspbr_1 & ~dspblock & ~cpulock_ip &
        ~v_munirq                ) | // changed on 8-10-92
      ( muni_ip1 & dspbr_1 & ~dspblock ) |
      ( dsp_ip1 & ~( munibr_1 & ~muniblock ) & dspbr_1 & ~dspblock ) |
      ( psc_ip1 & dspbr_1 & ~dspblock ) |
      ( dsp_ip2 & ~pscbr_1 & dspbr_1 & ~dspblock ) |
      ( muni_ip2 & dspbr_1 & ~dspblock ) |
      ( dsp_ip3 & ~( munibr_1 & ~muniblock ) & dspbr_1 & ~dspblock ) |
```

```
      ( psc_ip2 & dspbr_1 & ~dspblock ) |
      ( dsp_ip4 & ~pscbr_1 & dspbr_1 & ~dspblock ) |
      ( v_muni_ip & dspbr_1 & ~dspblock ) ;

always @( posedge ibclk )
      begin
          dspbg = #CK_TO_Q wdspbg;
      end /* D S P B G _ 1 */
  always @( posedge ibclk or negedge irstbclk_ )
      begin
        if( !irstbclk_ )
            dspbg_1 = #CK_TO_Q 1'b0;
        else
            dspbg_1 = #CK_TO_Q dspbg;
      end /* L D S P B G */
wire wldspbg;
assign
  #GATE_DL wldspbg = ( ibb_1 & dspbg_1 & ~( munibg | cpubg | pscbg) ) |
                     ( ldspbg & ~( dsp_hold_1 & ~dsp_hold_2 ) );

always @( posedge ibclk or negedge irstbclk_ )
      begin
        if ( !irstbclk_ )
            ldspbg = #CK_TO_Q 1'b0;
        else
            ldspbg = #CK_TO_Q wldspbg;
      end /* S D S P B R _ */
  always @( posedge ibclk )
      begin
          sdspbr_ = #CK_TO_Q dspbr_;
      end /* D S D S P B R _ */
  always @( posedge ibclk )
      begin
          dspbr_1 = #CK_TO_Q ~sdspbr_;
      end /* O B B _ */
wire wobb_;
assign
  #GATE_DL wobb_ = ~( ( dspbg_1 & ibb_1 & ~( munibg | cpubg | pscbg) ) |
                     ( ~obb_ & ~( dsp_hold_2 & ~dsp_hold_1) )
                   );

always @( posedge ibclk or negedge irstbclk_ )
      begin
          if( !irstbclk_ )
              obb_ = #CK_TO_Q 1'b1;
          else                            /* dspbg_1 is sampled to prevent the wrong assertion
```

```
*/          obb_ = #CK_TO_Q wobb_;      /* of other master's "block" signal. if block is
*/
                                         /* asserted by mistake, their bus grant would be
*/
                                         /* disabled for that cycle which generates problems
*/
                                         /* for the arbitor.
*/
     end /* D S P _ H O L D _ 2     */
always @( posedge ibclk )
    begin
        dsp_hold_2 = #CK_TO_Q dsp_hold_1;
    end /* D S P _ H O L D _ 1     */
always @( posedge ibclk )
    begin
        dsp_hold_1 = #CK_TO_Q dsp_hold;
    end /* D S P _ H O L D     */
always @( posedge ibclk )
    begin
        dsp_hold = #CK_TO_Q bbip;
    end /* ////////// P S C related arbitration signals //////////// */
       /* P S C B G       */ always @( posedge ibclk )
    begin
        pscbg = #CK_TO_Q ( dsp_ip2 & pscbr_1 ) |
            ( muni_ip1 & ~( dspbr_1 & ~dspblock ) & pscbr_1 ) |
            ( dsp_ip1 & ~( munibr_1 & ~muniblock ) &
             ~( dspbr_1 & ~dspblock) & pscbr_1              ) |
            ( cpu_ip & ~( munibr_1 & ~muniblock ) &
             ~( dspbr_1 & ~dspblock) & pscbr_1 & ~cpulock_ip &
             ~v_munirq ) |                    // REV'd on 8-10-92
            ( dsp_ip4 & pscbr_1 ) |
            ( dsp_ip3 & ~( munibr_1 & ~muniblock ) &
             ~( dspbr_1 & ~dspblock) & pscbr_1              ) |
            ( muni_ip2 & ~( dspbr_1 & ~dspblock ) & pscbr_1 ) |
            ( psc_ip1 & ~( munibr_1 & ~muniblock ) &
             ~( dspbr_1 & ~dspblock) & pscbr_1              ) |
            ( v_muni_ip & ~( munibr_1 & ~muniblock ) &
             ~( dspbr_1 & ~dspblock) & pscbr_1              ) ;
   end

/* ///////////// P S C B G _ 1    ////////////////// */ always @( posedge ibclk )
       begin
          pscbg_1 = #CK_TO_Q pscbg;
       end

/* ///////////// P S C B R _ 1    ////////////////// */ always @( posedge ibclk )
       begin
```

```
            pscbr_1 = #CK_TO_Q ~pscbr_;
        end

/* ////////// ARBITOR STATE MACHINE ///////////// */
/* This determines which bus master is active at a time */ always @( posedge ibclk or negedge irstbclk_ )
    begin
        if ( !irstbclk_ )
            arbstate = 4'd9;
        else if( ( ( arbstate == 4'd9 )  |
                   ( arbstate == 4'd10 )   // This line added dur. rev on 8-10-92
                 ) &
                 dspbg_1 & ibb_1 & en_dsp_ip )
            arbstate = 4'd0;

else if( ( ( arbstate == 4'd0) |
                     ( arbstate == 4'd10 )   // This line added dur. rev on 8-10-92
                   ) & munibg_1 & ibb_1
                 ) |
                 ( ( ( arbstate == 4'd9)
                   ) &
                     munibg_1 & ibb_1 & ~v_munirq
                 )
               )
            arbstate = 4'd1;

else if( ( ( arbstate == 4'd0) |
                   ( arbstate == 4'd1) |
                   ( arbstate == 4'd9) ) &
                 dspbg_1 & ibb_1 & en_dsp_ip )
            arbstate = 4'd2;

else if( ( ( arbstate == 4'd0) |
                   ( arbstate == 4'd1) |
                   ( arbstate == 4'd2) |
                   ( arbstate == 4'd10 ) |   // This line added dur. rev on 8-10-92
                   ( arbstate == 4'd9)
                 ) &
                 pscbg_1 & ibb_1 )
            arbstate = 4'd3;

else if( ( ( arbstate == 4'd2) |
                   ( arbstate == 4'd3) ) &
                 dspbg_1 & ibb_1 & en_dsp_ip )
            arbstate = 4'd4;

else if( ( ( arbstate == 4'd1) |
                   ( arbstate == 4'd2) |
                   ( arbstate == 4'd3) |
                   ( arbstate == 4'd4) ) &
                 munibg_1 & ibb_1 )
            arbstate = 4'd5;

else if( ( ( arbstate == 4'd4) |
                   ( arbstate == 4'd5) ) &
                 dspbg_1 & ibb_1 & en_dsp_ip )
            arbstate = 4'd6;

else if( ( ( arbstate == 4'd3) |
                   ( arbstate == 4'd4) |
                   ( arbstate == 4'd5) |
```

```
                        ( arbstate == 4'd6) ) &
                    pscbg_1 & ibb_1 )
            arbstate = 4'd7;

else if( ( ( arbstate == 4'd6) |
                    ( arbstate == 4'd7) ) &
                    dspbg_1 & ibb_1 & en_dsp_ip )
            arbstate = 4'd8;

else if( (   ( ( arbstate == 4'd0) |
                        ( arbstate == 4'd1) |
                        ( arbstate == 4'd2) |
                        ( arbstate == 4'd3) |
                        ( arbstate == 4'd4) |
                        ( arbstate == 4'd5) |
                        ( arbstate == 4'd6) |
                        ( arbstate == 4'd7) |
                        ( arbstate == 4'd8) |
                        ( arbstate == 4'd10) )    // This line added dur. rev on 8-10-92
                    ) & cpubg_1 & ibb_1
                ) |
                (   ( arbstate == 4'd9) & ibb_1 &
                    ~( dspbg_1 | munibg_1 | pscbg_1)
                )
            )
            arbstate = 4'd9;

else if ( ( arbstate == 4'd9 ) & munibg_1 & ibb_1 )
            arbstate = 4'd10;

else
            arbstate = arbstate;
    end

/* ////////// M U N I related arbitration signals ////////// */
        /* M U N I B G      */ always @( posedge ibclk )
    begin
        munibg = #CK_TO_Q  ( dsp_ip1 & munibr_1 & ~muniblock ) |
                           ( cpu_ip & ~( dspbr_1 & ~dspblock ) &
                             ~muniblock & munibr_1 & ~cpulock_ip )|
                           ( dsp_ip3 & munibr_1 & ~muniblock ) |
                           ( dsp_ip2 & ~pscbr_1 & ~( dspbr_1 & ~dspblock) &
                             munibr_1 & ~muniblock ) |
                           ( muni_ip1 & ~(dspbr_1 & ~dspblock) & ~pscbr_1 &
                             munibr_1 & ~muniblock ) |
                           ( psc_ip1 & ~( dspbr_1 & ~dspblock) & munibr_1 &
                             ~muniblock ) |
                           ( cpu_ip & ~cpulock_ip & v_munirq &
                             ~muniblock & munibr_1              )|
                           ( v_muni_ip & ~( dspbr_1 & ~dspblock ) &
                             ~muniblock & munibr_1
                           );
    end /* ////////// M U N I B G _ 1 ////////// */
always @( posedge ibclk )
    begin
        munibg_1 = #CK_TO_Q munibg;
    end
```

```
/* //////////// M U N I B R _ 1  //////////// */
 always @( posedge ibclk )
      begin
         munibr_1 = #CK_TO_Q ~munibr_;
      end /* //////////// C P U  related arbitration signals //////////// */
         /*     C P U B G      */ always @( posedge ibclk )
      begin
           cpubg = #CK_TO_Q ( dsp_ip5 ) |
              ( psc_ip2 & ~( dspbr_1 & ~dspblock) )|
              ( dsp_ip4 & ~pscbr_1 & ~( dspbr_1 & ~dspblock ) ) |
              ( muni_ip2 & ~( dspbr_1 & ~dspblock) & ~pscbr_1 )|
              ( dsp_ip3 & ~( munibr_1 & ~muniblock ) &
                 ~pscbr_1 & ~( dspbr_1 & ~dspblock ) ) |
              ( psc_ip1 & ~( munibr_1 & ~muniblock ) &
                 ~pscbr_1 & ~( dspbr_1 & ~dspblock ) ) |
              ( dsp_ip2 & ~( munibr_1 & ~muniblock ) &
                 ~pscbr_1 & ~( dspbr_1 & ~dspblock ) ) |
              ( muni_ip1 & ~( munibr_1 & ~muniblock ) &
                 ~pscbr_1 & ~( dspbr_1 & ~dspblock ) ) |
              ( dsp_ip1 & ~( munibr_1 & ~muniblock ) &
                 ~pscbr_1 & ~( dspbr_1 & ~dspblock ) ) |
              ( ( cpu_ip | v_muni_ip ) & ~( munibr_1 & ~muniblock ) &   // changed on 8-10
-92
                 ~pscbr_1 & ~( dspbr_1 & ~dspblock ) ) |
              ( cpu_ip & cpulock_ip );
      end /* //////////// C P U B G _ 1 //////////// */
 always @( posedge ibclk )
      begin
         cpubg_1 = #CK_TO_Q cpubg;
      end /* //////////// I T E A _ 1 _ //////////// */
 always @( posedge ibclk )
      begin
         itea_1_ = #CK_TO_Q itea_;
      end /* //////////// C P U L O C K _  //////////// */
 always @( posedge ibclk )
      begin
         cpulock_1 = #CK_TO_Q ~cpulock_;
      end

/* ////////// L O C K _ R E T R Y   ////// */ always @( posedge ibclk or negedge irstbclk_ )
      begin
         if( !irstbclk_ )
            lock_retry = #CK_TO_Q 1'b0;
         else
            lock_retry = #CK_TO_Q ( ~itea_1_ & cpulock_1 ) |
                           ( ~ibb_1 & lock_retry);
      end
``` endmodule

What is claimed is:

1. A Computer system comprising:

a processing unit;

a system bus coupled to said processing unit;

a main memory system coupled to said system bus;

a digital signal processor coupled to said system bus for utilizing said main memory system as an external memory over said system bus in conjunction with said processing unit using said main memory system over said system bus;

an arbiter in communication with said processing unit and said digital signal processor for processing system bus access requests, said arbiter for providing said digital signal processor with sufficient system bus bandwidth for access to said main memory system so as to facilitate real-time data processing without starving said processing unit from access to said main memory system over said system bus;

an I/O bus interface coupled to said system bus;

an I/O bus in communication with said system bus through said I/O bus interface;

wherein said arbiter is further in communication with said I/O bus interface, said arbiter further arbitrating said system bus to provide sufficient system bus bandwidth to support resources coupled to said I/O bus;

an network port coupled to said I/O bus for connecting said computer system to a local area network;

an expansion card peripheral bus;

an expansion card peripheral bus controller for coupling said peripheral bus to said system bus;

wherein said arbiter is further in communication with said peripheral bus controller, said arbiter further arbitrating said system bus to provide sufficient system bus bandwidth to support resources coupled to said peripheral bus; and wherein said arbiter designates any one of said processing unit, said digital signal processor, said I/O interface or said peripheral bus controller as the master on said system bus, said arbiter making said designation according to the following state diagram:

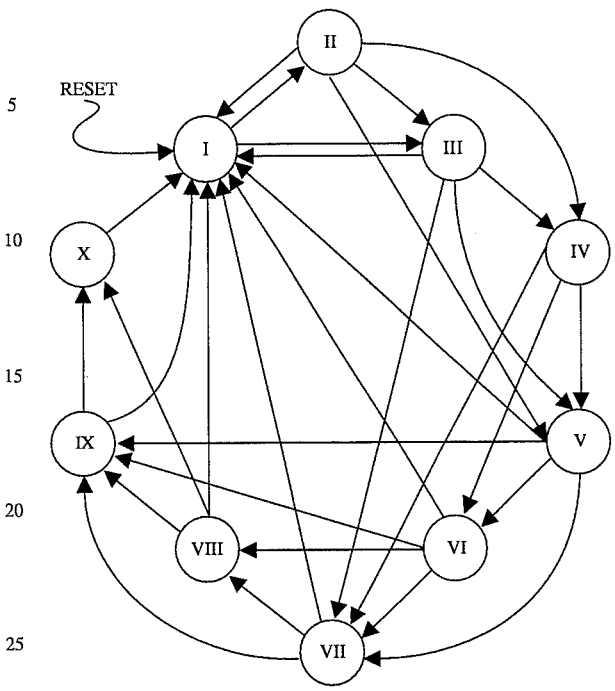

wherein state I corresponds to the state where said processing unit is assigned ownership of said system bus, states II, IV, VI and VIII correspond to the state where said digital signal processor is assigned ownership of said system bus, states III and VII correspond to the state where said peripheral bus controller is assigned ownership of said system bus, and states V and IX correspond to the state where said I/O bus interface is assigned ownership of said system bus.

2. The computer system of claim 1 wherein said arbiter defaults the system bus assignment to state I when no other system bus resource requests said system bus.

3. The computer system of claim 1 wherein said arbiter further comprises a watchdog timer for limiting the total amount of time said digital signal processor may be assigned ownership of said system bus in a given arbitration cycle.

4. The computer system of claim 3 wherein said arbiter further comprises an eleventh state according to the following state diagram:

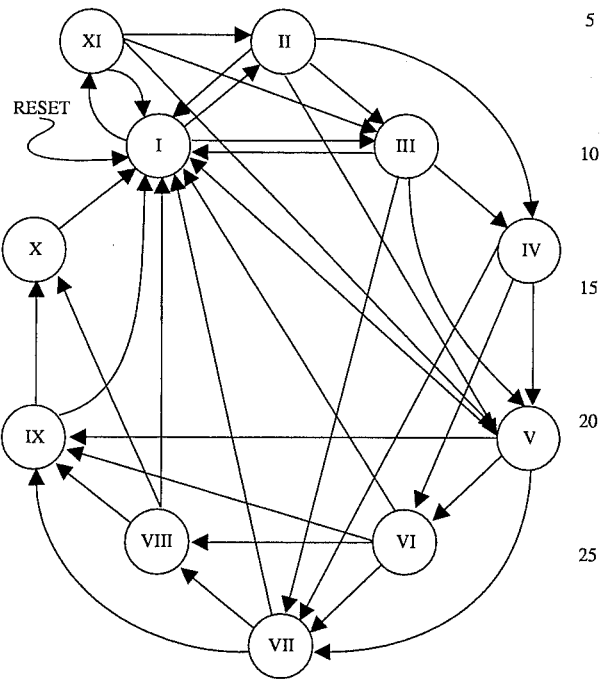

wherein state XI corresponds to an exceptional state for said peripheral bus controller to be assigned ownership of said system bus.

5. A computer system comprising:
   a processing unit;
   a system bus coupled to said processing unit;
   a main memory system coupled to said system bus;
   a digital signal processor coupled to said system bus for utilizing said main memory system as an external memory over said system bus in conjunction with said processing unit using said main memory system over said system bus;
   an I/O bus interface coupled to said system bus;
   an I/O bus in communication with said system bus through said I/O bus interface;
   a peripheral bus;
   a peripheral bus controller for coupling said peripheral bus to said system bus;
   an arbiter in communication with said processing unit, said digital signal processor, said I/O bus interface and said peripheral bus controller for processing system bus access requests, said arbiter for providing said digital signal processor with sufficient system bus bandwidth for access to said main memory system so as to facilitate real-time data processing without starving said processing unit from access to said main memory system over said system bus;
   said arbiter further for providing said I/O bus and said peripheral bus with sufficient system bus bandwidth to meet their needs while still providing sufficient system bus bandwidth to said digital signal processor for real-time processing using said main memory system;
   an Ethernet port coupled to said I/O bus for connecting said computer system to a local area network;
   wherein said peripheral bus comprises a NuBus peripheral bus and said peripheral bus controller comprises a NuBus controller; and
   wherein said arbiter designates any one of said processing unit, said digital signal processor, said I/O interface or said peripheral bus controller as the master on said system bus, said arbiter making said designation according to the following state diagram:

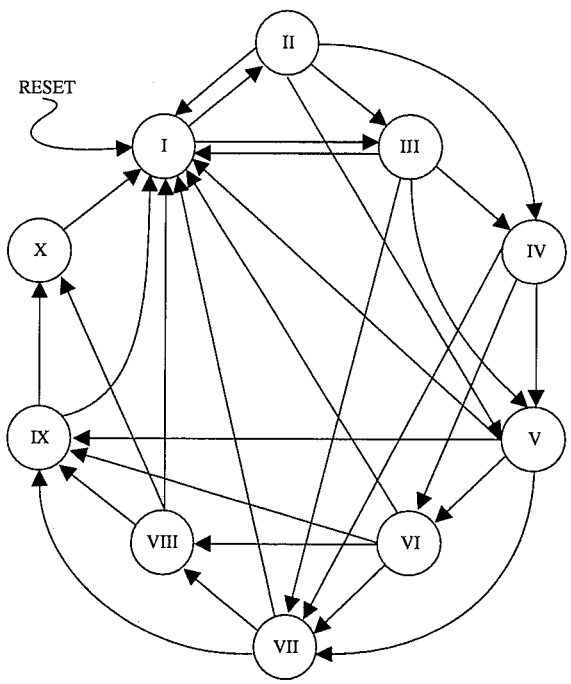

wherein state I corresponds to the state where said processing unit is assigned ownership of said system bus, states II, IV, VI and VIII correspond to the state where said digital signal processor is assigned ownership of said system bus, states III and VII correspond to the state where said peripheral bus controller is assigned ownership of said system bus, and states V and IX correspond to the state where said I/O bus interface is assigned ownership of said system bus.

6. The computer system of claim 5 wherein said arbiter further comprises a watchdog timer for limiting the total amount of time said digital signal processor may be assigned ownership in a given arbitration cycle.

7. The computer system of claim 6 wherein said arbiter further comprises an eleventh state according to the following state diagram:

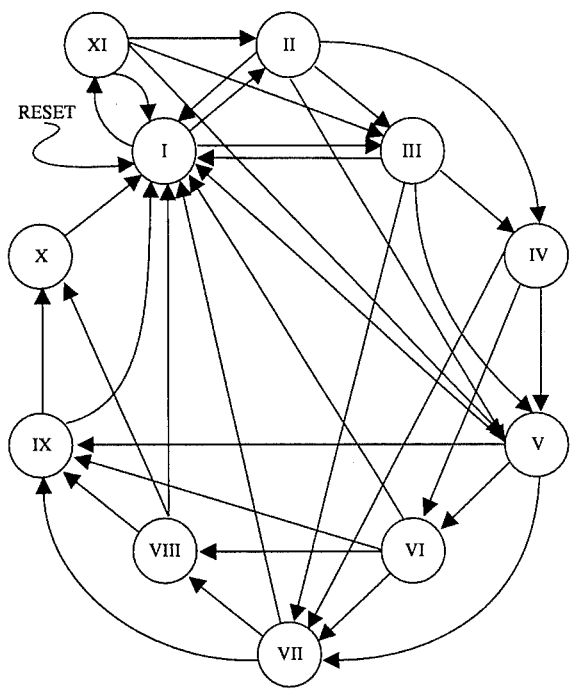

wherein state XI corresponds to an exceptional state for said peripheral bus controller to be assigned ownership of said system bus.

8. For use in a computer system having a system bus, a central processing unit (CPU) coupled to said system bus, a main memory subsystem coupled to said memory bus, a digital signal processor (DSP) coupled to said memory bus for operating from said main memory subsystem, a method of sharing said system bus comprising the steps of:

provinding said computer system with an arbiter for processing system bus access requests;

assigning said system bus to said DSP for a sufficient amount of time to allow for real-time signal processing by said DSP;

said DSP utilizing said system bus for access to said main memory subsystem, said DSP utilizing said main memory subsystem over said system bus as an external memory in conjunction With said processing unit using said main memory subsystem over said system bus;

wherein said computer system further comprises an I/O bus in communication with said system bus through an I/O interface and a peripheral bus in communication with said system bus through a peripheral bus controller, said method further comprising the steps of;

assigning ownership of said system bus to said I/O bus sufficient to satisfy the requirements of a local area network in communication with said computer system through said I/O bus;

assigning ownership of said system bus to said peripheral bus to satisfy latency requirements defined by a NuBus standard;

defaulting the system bus to be parked on said CPU; and wherein said assigning steps for said system bus follow the states of the following state diagram:

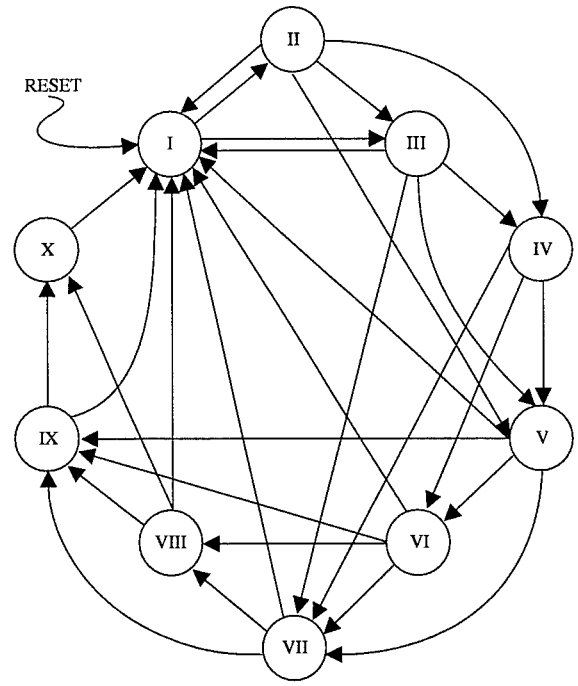

wherein state I corresponds to the state where said processing unit is assigned ownership of said system bus, states II, IV, VI and VIII correspond to the state where said digital signal processor is assigned ownership of said system bus, states III and VII correspond to the state where said peripheral bus controller is assigned ownership of said system bus, and states V and IX correspond to the state where said I/O bus interface is assigned ownership of said system bus.

* * * * *